US007940939B1

(12) United States Patent
Hamilton et al.

(10) Patent No.: US 7,940,939 B1
(45) Date of Patent: May 10, 2011

(54) VEHICLE TRUNK WOOFER

(76) Inventors: Donald F. Hamilton, Sterling, MA (US); Michael D. Rosen, Auburndale, MA (US)

( * ) Notice: Subject to any disclaimer, the term of this patent is extended or adjusted under 35 U.S.C. 154(b) by 850 days.

(21) Appl. No.: 08/777,958

(22) Filed: Dec. 24, 1996

Related U.S. Application Data

(63) Continuation-in-part of application No. 07/871,926, filed on Apr. 21, 1992, now abandoned.

(51) Int. Cl.
*H04B 11/00* (2006.01)
*H04R 1/02* (2006.01)

(52) U.S. Cl. .......................................... 381/86; 381/389

(58) Field of Classification Search .................... 381/86, 381/88, 90, 24, 188, 205; 181/141, 150, 181/199, 148, 156
See application file for complete search history.

(56) References Cited

U.S. PATENT DOCUMENTS 4,164,988 A * 8/1979 Virva ............................ 181/156
4,572,326 A * 2/1986 Hutchins ....................... 181/150
4,696,369 A 9/1987 Dodrill

OTHER PUBLICATIONS

Ziffer, Amy V., "Car Audio and Electronics", Mar. 1991, pp. 46-50.*
"Bazooka Bass Tubes" disclosed in Car Audio and Electronics', Jan. 1990, p. 41.*
Peter van Rijsbergen, The Car Stereo Manual, Boldt Publishing Company, 1981, p. 21.*
Ziffer, A., Family Affair, May 1991, Car Audio and Electronics, pp. 38-42.*
Justin, Justin's Volvo, Cardomain.com, http://www.cardomain.com/memberpage/425664/2.*
Bazooka Bass Tube Advertisement, Car Audio and Electronics Magazine, Jan. 1990, p. 41.*
Newcomb, "Somthing Fishy", Car Audio and Electronics, vol. 5, No. 2, Feb. 1992, pp. 28-32.

* cited by examiner

*Primary Examiner* — Ping Lee
(74) *Attorney, Agent, or Firm* — Fish & Richardson P.C.

(57) ABSTRACT

A vehicle trunk woofer is a low frequency speaker disposed within the trunk of a vehicle so as to be separated from the vehicle passenger compartment by a dividing portion and a rear deck. The dividing portion may be a fixed element or a movable element, such as a fold down rear seat. The speaker mounted in the trunk may be mounted in an enclosure and may be mounted adjacent to the dividing portion, but is not mounted to the rear deck.

8 Claims, 3 Drawing Sheets

TOP VIEW OF TRUNK

TOP VIEW OF TRUNK

REAR SIDE VIEW OF TRUNK

VEHICLE TRUNK WOOFER

This is a continuation-in-part application of application Ser. No. 07/871,926 filed Apr. 21, 1992, now abandoned.

The invention relates to audio speakers for automobiles. More particularly, the invention relates to the placement of a low frequency audio speaker to effect improved frequency response in the interior of the vehicle with a trunk speaker that occupies negligible useful trunk volume.

It has been known in the automobile speaker art to mount a speaker having low frequency response in a hole formed in the rear deck (package shelf) of the vehicle. However, this prior art configuration has the disadvantage that, in the front seat, a “hole” is usually experienced in the frequency response between 60-80 Hertz. This prior art configuration also has the disadvantage that, in the rear seat, an undesirable peak in the frequency response is usually experienced between 80-100 Hertz. The prior art configuration has the further disadvantage that; the speakers mounted in the rear deck reduce the calculated trunk volume of the vehicle.

According to the invention at least one low frequency response speaker is within the trunk of the vehicle, above the trunk floor and outside any compartment containing a spare tire, preferably in a lower rear corner, but not attached to the rear deck and without speaker holes being cut in the rear deck.

Other features, objects and advantages will become apparent from the following detailed description when read in connection with the accompanying drawings in which.

Figure 1:
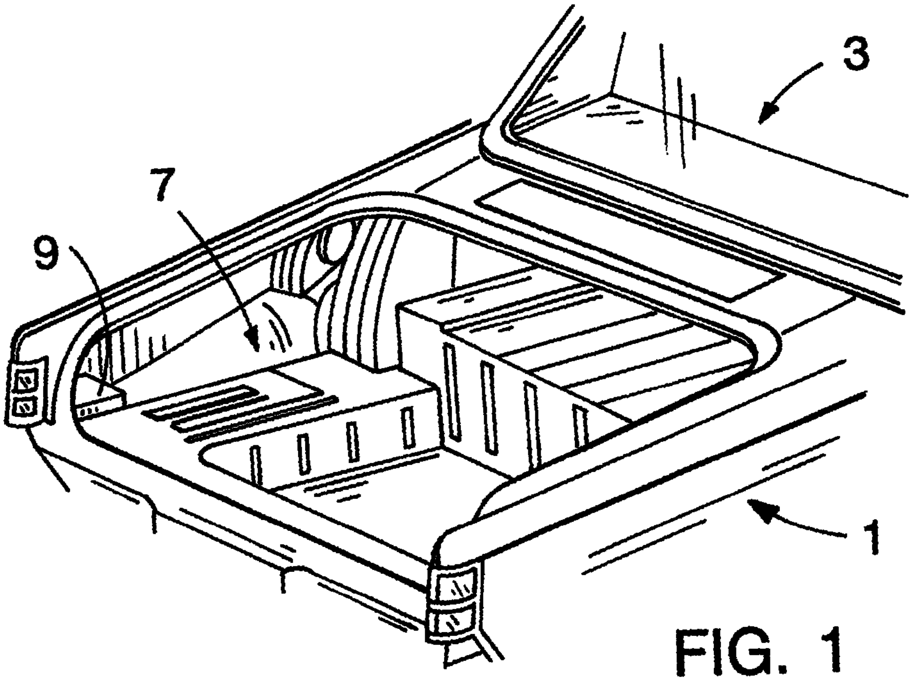
FIG. 1 is a rear three-quarter view of an automobile showing speaker placement according to an exemplary embodiment of the invention.
Figure 2:
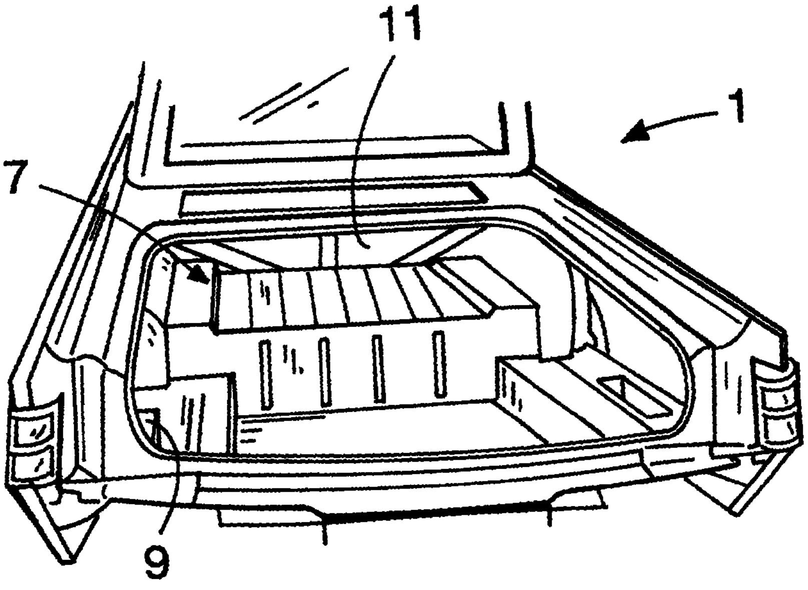
FIG. 2 is a rear view of an automobile showing speaker placement in accordance with the embodiment of FIG. 1.

With reference now to the drawings and more particularly FIG. 1, a speaker enclosure 9 is placed in a rearward section of the trunk 7 of the vehicle 1 above the trunk floor 8 and outside any compartment containing the spare tire. The speaker enclosure 9 is not, however, mounted to the rear deck 3 nor are speaker holes provided in the rear deck. As shown in the rear view of FIG. 2, placement of the speaker enclosure 9 is preferably in a corner of the vehicle trunk 7 (here the left corner) occupying negligible useful trunk volume.

The speaker configuration of the invention has numerous advantages over the prior art. Since the invention does not require holes to be cut in the rear deck, transmission of road noise into the passenger compartment is reduced. The package shelf does not, however, affect low frequencies (+/−1 dB), and the trunk as a whole acts as a natural low-pass filter. Also, because of the way auto manufacturers calculate useful trunk volume, the enclosure in the corner of the trunk results in a smaller decrease in calculated useful trunk volume then do speakers mounted in the rear deck.

Figure 5:
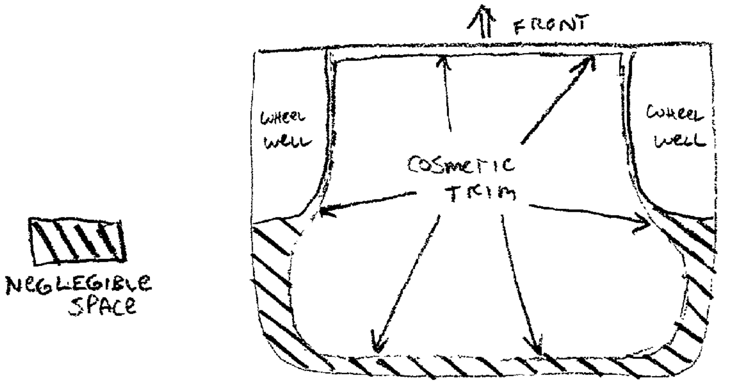
FIGS. 5 and 6 are top views and FIG. 7 is a rear view of a trunk helpful in understanding the useful trunk volume.
Figure 6:
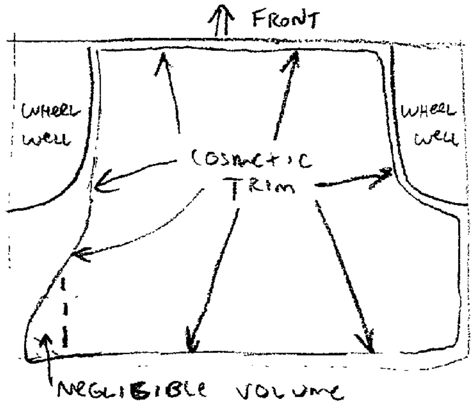
Figure 7:
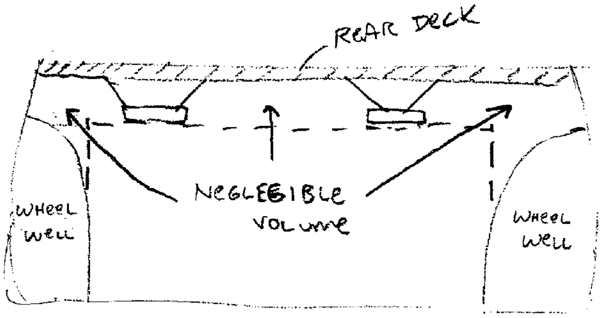

When calculating trunk’s volume, manufacturers neglect to count volumes that are (1) behind cosmetic panels identified as cosmetic trim in the top view of a trunk in FIG. 5, (2) before cosmetic trim but that are small or odd shaped, making the use of that space for storage of a suitcase or box nearly impossible, such as identified as negligible volume in the top view of a trunk in FIG. 6, and (3) around items which protrude into the trunk, such as speakers attached to the rear decks as shown in the rear view of a trunk in FIG. 7. The reference to negligible useful trunk volume means that the enclosure portion in the useful trunk volume is a small percentage of the useful trunk volume.

Figure 3:
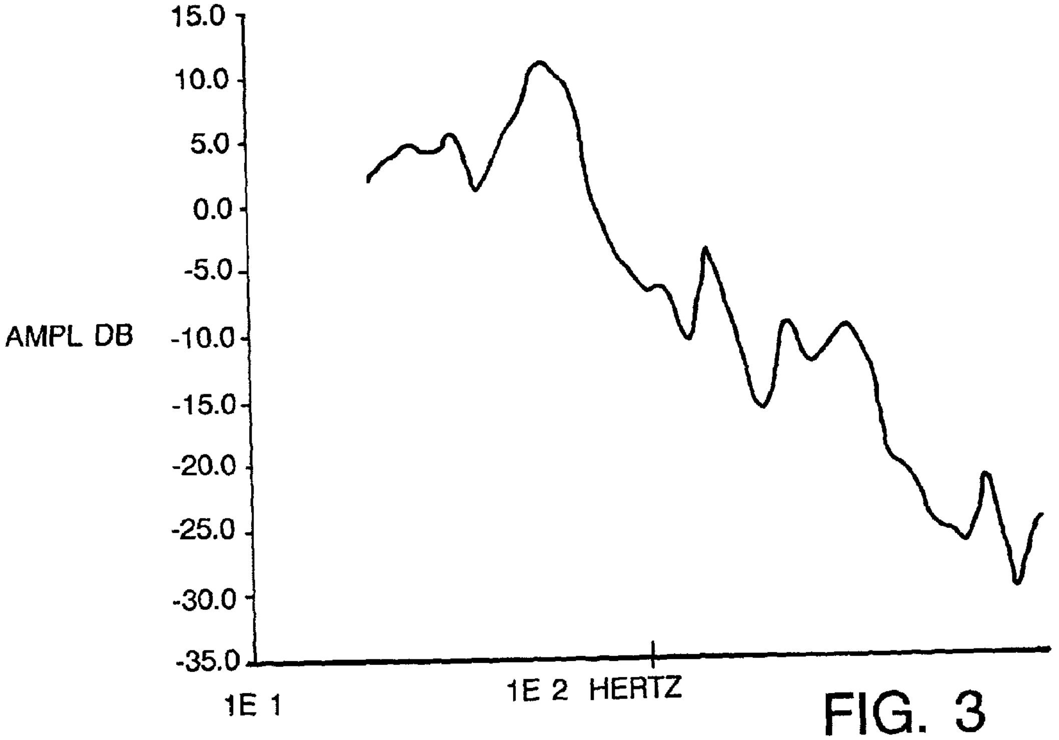
FIG. 3 is a graph showing a comparison between front seat frequency response according to the present invention and front seat frequency response obtained using the prior art arrangement.
Figure 4:
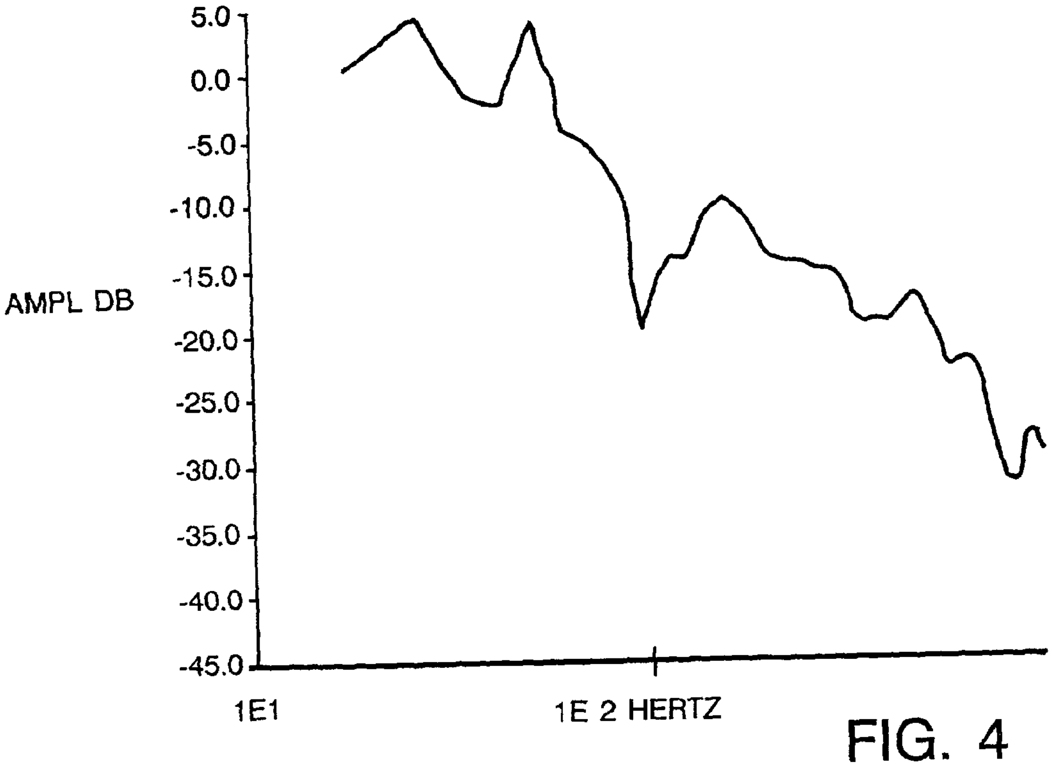
FIG. 4 is a graph showing a comparison between rear seat frequency response according to the present invention with the frequency response obtained using the prior art arrangement.

The frequency response of the configuration according to the invention is greatly superior to that obtained with the prior art. Using deck-mounted speakers, a “hole” in frequency response is normally experienced in the front seat between 60-80 Hertz. The graph of FIG. 3, which is a comparison between the front seat frequency response using deck-mounted speakers and the speaker arrangement of the invention, clearly shows that the hole between 60 and 80 Hertz is substantially eliminated. Similarly, using conventional deck-mounted, speakers a peak in frequency response is usually encountered in the rear seat between 80 and 100 Hertz. Referring to FIG. 4, which is a comparison between rear seat frequency response of deck-mounted speakers and rear seat response using the configuration of the invention, the peak between 80-100 Hertz is substantially eliminated.

While the speaker is shown mounted in an enclosure according to the preferred embodiment, the speaker could be mounted in the trunk without a separate enclosure. Also, although the enclosure is shown mounted in the left corner of the trunk, any rear remote area of the trunk would be acceptable for the purposes of the invention.

While there are shown and described present embodiments of the invention, it is to be distinctly understood that the invention is not limited thereto, but may be otherwise variously embodied and practiced within the scope of the following claims.

What is claimed is:

1. An audio speaker system for a vehicle having a passenger compartment, a spare tire compartment, a trunk having a trunk floor, a dividing portion and a rear deck, said dividing portion and said rear deck dividing the trunk and the passenger compartment, said audio speaker system comprising at least one low frequency speaker disposed within the trunk of the vehicle at the trunk rear in a location spaced from the passenger compartment by the portion of the trunk extending to the front of said vehicle such that said at least one speaker is clear of the rear deck above said trunk floor and outside said spare tire compartment, wherein said at least one speaker is disposed in a rearward section of the trunk occupying negligible useful trunk volume to cause a smaller decrease in calculated trunk volume than would occur with said at least one speaker mounted in said rear deck.

2. An audio speaker system in accordance with claim 1, wherein said at least one speaker is disposed in a rear trunk corner at the rear of said vehicle.

3. An audio speaker system in accordance with claim 1, wherein said at least one speaker is mounted in an enclosure.

4. An audio speaker system in accordance with claim 1, wherein said vehicle is characterized by a front seat frequency response and a rear seat frequency response constructed and arranged to be free of an undesirable peak in the rear seat frequency response of said vehicle between 80-100 Hz and free of an undesirable hole between 60-80 Hz in the front seat frequency response of said vehicle.

5. An audio speaker system for a vehicle in accordance with claim 1 wherein said rear deck is free of speaker holes.

6. An audio speaker system in accordance with claim 5, wherein said at least one speaker is disposed in a rear trunk corner at the rear of said vehicle.

7. An audio speaker system in accordance with claim 5, wherein said at least one speaker is mounted in an enclosure.

8. An audio speaker system in accordance with claim 5, wherein said vehicle is characterized by a front seat frequency response and a rear seat frequency response constructed and arranged to be free of an undesirable peak in the rear seat frequency response of said vehicle between 80-100 Hz and free of an undesirable hole between 60-80 Hz in the front seat frequency response of said vehicle.

* * * * *